Feb. 26, 1957     W. L. STRAUSS     2,782,559
MULTIPLE VEHICLE TOY
Filed July 14, 1954     2 Sheets-Sheet 1
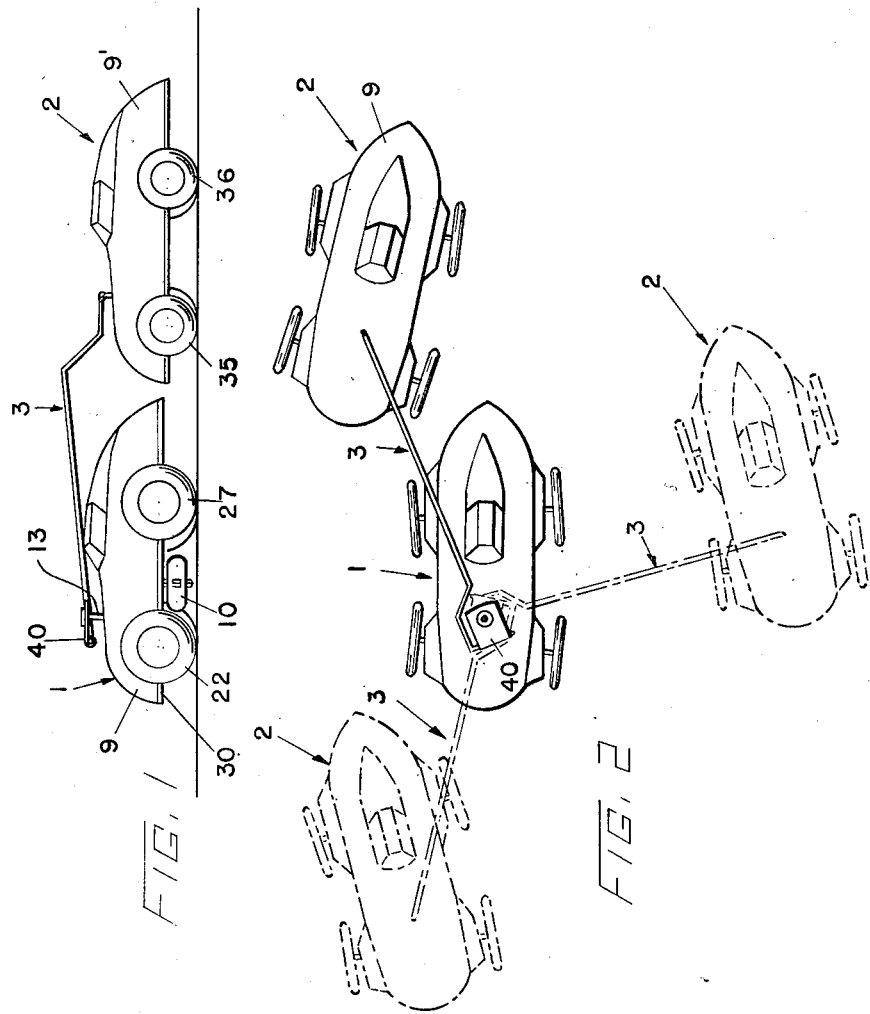
*INVENTOR.*
WALTER L. STRAUSS
BY
ATTORNEY Feb. 26, 1957 W. L. STRAUSS 2,782,559
MULTIPLE VEHICLE TOY
Filed July 14, 1954 2 Sheets-Sheet 2
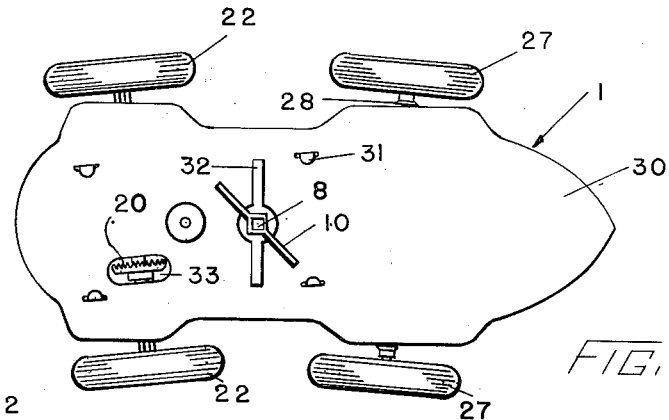
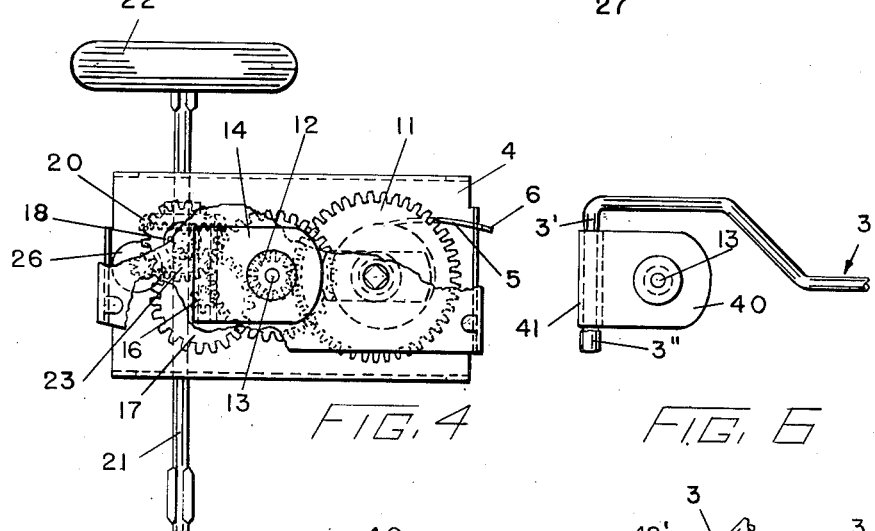
INVENTOR.
WALTER L. STRAUSS
BY
ATTORNEY

United States Patent Office 2,782,559
Patented Feb. 26, 1957

2,782,559

MULTIPLE VEHICLE TOY

Walter L. Strauss, New York, N. Y.

Application July 14, 1954, Serial No. 443,385

11 Claims. (Cl. 46—206)

The present invention relates to vehicle toys and more particularly to vehicle toys in which several joint vehicles, while travelling in a generally forward direction automatically and continuously change their relative position.

One of the objects of the present invention is to provide a novel and improved multiple vehicle toy of the general type, above described, in which the joining means between the several vehicles, generally two, compel the two vehicles to occupy different positions relative one to the other while continuing their travel in a generally forward direction.

Another object of the invention is to provide a novel and improved multiple vehicle toy in which the positions of the two vehicles, such as two toy cars relative to each other are so controlled that the two vehicles appear to be engaged in a race.

Still another object of the invention is to provide a novel and improved multiple vehicle toy in which the two cars appear to be engaged in a race in which the two cars alternately gain the lead while passing each other on one side or the other.

A further object of the invention is to provide a novel and improved multiple vehicle toy in which one vehicle is self-propelled and the other vehicle is free wheeling and pulled or pushed by the propelled vehicle, and in which the driving mechanism of the propelled vehicle operates the joining or linking means between the two vehicles so that the free wheeling vehicle gradually changes its position from a position trailing the propelled vehicle to a position abreast therewith and then to a position ahead thereof. After having gained the lead, the free wheeling vehicle appears to fall back into its position trailing the propelled vehicle. As the two vehicles simultaneously move along the surface upon which they are placed, an exciting and highly amusing display of two cars engaged in a close race is presented.

According to the invention, the aforementioned objects, features and advantages and others which will appear hereinafter, are attained by providing a rigid arm rotated in a generally horizontal plane by the driving mechanism of the propelled vehicle and linked to the other vehicle freely rotatable relative to the body thereof whereby the latter vehicle is compelled to occupy continually varying positions relative to the propelled vehicle as determined by the momentary rotational position of the arm.

In the accompanying drawing a preferred embodiment of the invention is shown by way of illustration and not by way of limitation.

In the drawing:

Fig. 1 is an elevational side view of the two linked cars.

Fig. 2 is a plan view of the linked cars showing the same in several positions relative to each other.

Fig. 3 is a bottom view of the self-propelled car.

Fig. 4 is a bottom view of the driving mechanism of the self-propelled car.

Fig. 5 is a sectional elevational view of the driving mechanism of Fig. 4.

Fig. 6 is a view of the connection between the connecting rod and the driving mechanism of the propelled car, and Fig. 7 is a fragmentary sectional view of the connection between the connecting rod and the free wheeling car.

Referring now to the figures in detail, the multiple vehicle toy according to the invention comprises a self-propelled vehicle generally designated by 1 and a free wheeling vehicle generally designated by 2. While both the vehicles are shown in form of cars, and more particularly of racing cars, they may also take other shapes such as motorcycles etc., as will become apparent from the subsequent description.

The two cars are linked together by a connecting rod generally designated by 3 by means of which car 2 is compelled to move into a multitude of different positions relative to car 1 and on either side thereof, three of which are shown in Fig. 2.

Car 1 is equipped with a driving mechanism in form of a spring actuated motor the details of which are shown in Figs. 4 and 5. The car motor is mounted in a sheet metal frame 4. It comprises a spring 5 the outer end 6 of which is anchored in a side wall of frame 4. A nose 7 limits the expansion of the spring. The inner end of the spring is secured to a spring shaft 8 protruding from frame 4 and also from the car body 9 as can best be seen in Fig. 1. Shaft 8 supports a handle or plate 10 to form a key for winding spring 5 in a conventional manner. The shaft further seats an input gear 11 which is in mesh with a pinion 12 seated on a perpendicular shaft 13 rotatably mounted in frame 4 and upwardly protruding from car body 9 as can best be seen in Fig. 1. Shaft 13 further seats a gear 14 which is in mesh with an axially elongated pinion 15 seated on a shaft 16, rotatably mounted in frame 4. Shaft 16 further seats a gear 17 in mesh with an axially elongated pinion 18 seated on a shaft 19, rotatably mounted in frame 4. Pinion 18 is in mesh with a bevel gear 20 fixedly secured to the axle 21 of front wheels 22 for driving the same. The axle is seated in car body 9. Shaft 19 further seats a gear 23 in mesh with a pinion 24 seated on a shaft 25 rotatably mounted in frame 4. Shaft 25 also supports an eccentric governor 26 to assure a reasonably uniform run-down speed of the motor. The ratios of transmission are preferably so selected that the rotational speed of shaft 13 is less than the rotational speed of output gear 20 of the aforedescribed gear train.

The rear wheels 27 of the car are seated on an axle 28 freely rotatable in car body 9.

The car body is closed by a bottom plate 30 mounting the car motor which is secured to the bottom plate by any suitable means such as conventional bent over lugs 31 extending through appropriate slots in the plate. The plate is further provided with slots 32 and 33 to accommodate key plate 10 and bevel gear 20 respectively. The bottom plate and with it the car motor may be secured to the car bottom by any suitable means such as bent over lugs but it is preferred to join the car body and the bottom plate by beading the bottom plate and springing the car body behind the beading of plate 30.

The car wheels may be disposed in alignment but they are preferably set for a slight curve as can be clearly seen in Fig. 3, to limit the area over which the toy will travel.

Car 2 is similar in its outward appearance to car 1 but it is not equipped with a spring motor. Front and rear wheels 35 and 36 of car 2 are preferably adjusted similarly to the wheels of car 1.

Shaft 13 mounts a linking plate 40 fixedly secured to the shaft for rotation in unison therewith. The plate is turned over along one edge to form a bearing sleeve 41 disposed parallel to the running plane of the cars. Sleeve 41 serves to link connecting rod 3 to car 1 so that rod is rotated with car 1 and more specifically shaft 13 thereof as the center of rotation and to permit rod 3 to perform a slight rocking or pivotal movement in a vertical plane. For this purpose end 3' of rod 3 is bent off at a right angle to the rod and rotatably extended through sleeve 41. The rod end protruding from the sleeve is preferably flattened at 3" to secure the rod to plate 40. As can best be seen in Fig. 6, rod 3 is preferably cranked so that the straight part of the rod is in radial alignment with the rotational axis of shaft 13.

The other end of rod 3 is linked to body 9' of car 2, freely rotatable relative thereto. For this purpose, the respective rod end is bent off at 42 and the bent off rod end is extended through an opening 43 in the top wall of car body 9'. The diameter of hole 43 is appreciably larger than the diameter of rod end 42 to permit a limited tilting and play of the rod end relative to body 9' as is indicated in Fig. 7 by showing different positions of tilt of the rod in full lines and dotted lines respectively. The rod end is retained within the car body by an outer disc 44 and an inner disc 45 which are held in position by any suitable means such as flattening rod end 42 at 42' and 42" respectively.

The multiple vehicle toy as hereinbefore described, functions as follows:

Let it be assumed that the spring motor of car 1 is wound and that both vehicles are placed upon a suitable running surface. The two cars may be initially placed in any desired relative position but it is advisable to place the two cars in an abreast position to create the illusion of the start of a race with the participants placed at the starting line. In this position of the cars, connecting rod 3 will extend at about a right angle from car 1.

When the cars are released, car 1 begins to run forwardly along a path as determined by the setting of its front wheels. Simultaneously the car motor rotates shaft 13 and with it connecting rod 3. As a result, car 2 moves gradually into a position leading car 1, the said position being the left hand position of car 2 in Fig. 2. As the rotation of rod 3 continues, car 2 gradually moves into the position shown at the bottom of Fig. 2 thereupon into the right hand position of Fig. 2 and so forth.

As appears from the previous description, car 2 only moves relative to car 1, however, due to the rapid changes in the relative positions of the cars and the simultaneous forward movement of both the cars, an illusion is created as if each of the two cars is alternately leading and trailing while the cars are progressing along a path which may be visualized as a race track. Since the rotation of rod 3 compels car 2 to circle about car 1, it alternately passes this car on one side or the other thereby further increasing the illusion of an actual race. It will be noted that in the right hand position of car 2 as shown in Fig. 2, car 2 is pulled by car 1 whereas in the left hand position car 2 is pushed by car 1.

The aforedescribed continuous change in the relative positions of the cars and the simultaneous forward movement of the cars continues until the spring motor is run down.

The observation of the two cars engaged in a race is amusing and interesting to a playing child. The playing enjoyment can further be increased by starting, as mentioned before, the two cars from an abreast position and to judge the outcome of the race by the relative positions of the cars when they come to a stop.

While the invention has been described in detail with respect to a certain now preferred example and embodiment of the invention it will be understood by those skilled in the art after understanding the invention, that various changes and modifications may be made without departing from the spirit and scope of the invention, and it is intended therefore, to cover all such changes and modifications in the appended claims.

What is claimed as new and desired to be secured by Letters Patent, is:

I claim:

1. A multiple vehicle toy comprising a self-propelled first vehicle including a driving mechanism, a free wheeling second vehicle disposed in the same horizontal plane as the first vehicle, a rigid connecting arm coupled with one end to the driving mechanism continuously to revolve the other end of said arm about said first vehicle as center in a generally horizontal plane, the said other end of the arm being secured to the second vehicle, freely rotatable relative thereto whereby the revolutions of said arm causes the second vehicle to circle about the first vehicle while both the vehicles simultaneously travel along together in a generally common direction.

2. A multiple vehicle toy comprising a self-propelled first vehicle including a driving mechanism, a free wheeling second vehicle disposed in the same horizontal plane as the first vehicle, a drive shaft upwardly extending from the first vehicle and coupled with the driving mechanism for continuous rotation thereby, a rigid connecting arm extending from said shaft in a generally horizontal plane for revolving in said plane about the first vehicle as center, the free end of said arm engaging the second vehicle freely rotatable relative thereto whereby rotation of said arm causes the second vehicle to circle about the first vehicle while both the vehicles simultaneously travel along together in a generally common direction.

3. A multiple vehicle toy comprising a self-propelled and self-steered first vehicle including a driving mechanism, a free wheeling second vehicle disposed in the same horizontal plane as the first vehicle, both of said vehicles being adapted to be supported upon a substantially horizontal surface, a drive shaft perpendicularly extending from the top of the first vehicle and coupled for continuous rotation with the driving mechanism thereof, a rigid connecting arm secured with one end to said shaft laterally extending therefrom for causing the other end of said arm to revolve about the first vehicle as center in a generally horizontal plane, the other end of the arm being linked to the second vehicle for a push-pull connection of the arm with the second vehicle to move said second vehicle relative to said first vehicle in said horizontal plane, whereby the first vehicle moves the second vehicle through a cycle including a trailing position, an abreast position and a leading position as the arm describes a complete circle, and simultaneously moves in a common direction jointly with the second vehicle.

4. A vehicle toy according to claim 3, wherein a linking member is secured to said perpendicular shaft, said linking member forming a bearing for said arm permitting pivoting thereof in a generally perpendicular plane.

5. A vehicle toy according to claim 4, wherein the said linking member comprises a plate bent over along one edge to form a bearing sleeve for said arm.

6. A vehicle toy according to claim 3, wherein the said other end of the connecting arm is substantially perpendicularly bent off, and wherein the said second vehicle comprises a vehicle body having a hole therethrough, the said bent-off end of the arm extending into the vehicle body freely rotatable therein.

7. A vehicle toy according to claim 6, wherein a retaining member is secured to the arm end within said hole for retaining the said arm end within the hole.

8. A vehicle toy according to claim 6, wherein the diameter of said hole is wider than the diameter of the arm end within the hole to permit limited tilting of the arm relative to the vehicle body.

9. A vehicle toy according to claim 1, wherein each of said vehicles simulates a car, the said relative positions of the cars simulating a race between the cars in which each car is alternately leading and trailing and the cars pass each other on opposite sides.

10. A vehicle toy according to claim 2, wherein the ratio of transmission at which the driving mechanism rotates the wheels of the propelled vehicle is higher than the ratio of transmission at which the driving mechanism rotates said shaft.

11. A multiple vehicle toy comprising a self-propelled and self-steered first vehicle including a driving mechanism, a free-wheeling second vehicle disposed in the same horizontal plane as the first vehicle, a drive shaft perpendicularly extending from the top of the first vehicle and coupled for continuous rotation with the driving mechanism thereof, a rigid connecting arm secured with one end to said shaft laterally extending therefrom to beyond the exterior extremities of said first vehicle for causing the other end of said arm to revolve about the first vehicle as a center in a generally horizontal plane, the other end of the arm being linked to the second vehicle for a push-pull connection of the arm with the second vehicle to steer said second vehicle and revolve said second vehicle about said first vehicle, and said first vehicle and said connecting arm being further adapted to direct the travel of said second vehicle together with said first vehicle in a generally common direction.

References Cited in the file of this patent

UNITED STATES PATENTS

| | | |
|---|---|---|
| 1,028,355 | Huff | June 4, 1912 |
| 2,159,974 | Lohr | May 30, 1939 |

FOREIGN PATENTS

| | | |
|---|---|---|
| 647,871 | Great Britain | Dec. 20, 1950 |